(12) United States Patent
Thomas

(10) Patent No.: US 7,980,637 B2
(45) Date of Patent: Jul. 19, 2011

(54) BRAKE CONTROL VALVE WITH AAV STABILITY

(75) Inventor: Marc Thomas, Dexter, NY (US)

(73) Assignee: New York Air Brake Corporation, Watertown, NY (US)

(*) Notice: Subject to any disclaimer, the term of this patent is extended or adjusted under 35 U.S.C. 154(b) by 534 days.

(21) Appl. No.: 12/039,180

(22) Filed: Feb. 28, 2008

(65) Prior Publication Data

US 2009/0218880 A1    Sep. 3, 2009

(51) Int. Cl.
*B60T 17/04*    (2006.01)

(52) U.S. Cl. .............. 303/70; 303/3; 303/9; 303/15; 303/82

(58) Field of Classification Search .......... 303/70, 303/3, 9.1, 15, 36, 37
See application file for complete search history.

(56) References Cited

U.S. PATENT DOCUMENTS

| | | | |
|---|---|---|---|
| 2,812,985 A * | 11/1957 | Thomas et al. ............... 303/35 |
| 4,043,605 A | 8/1977 | Hart |
| 4,586,756 A | 5/1986 | Hintner |
| 4,592,598 A | 6/1986 | Hintner |
| 5,503,467 A | 4/1996 | Gaughan |
| 5,676,431 A | 10/1997 | McLaughlin et al. |
| 6,186,600 B1 | 2/2001 | Scott et al. |
| 6,318,812 B1 * | 11/2001 | Newton et al. ............... 303/82 |
| 6,472,769 B1 | 10/2002 | Long, Jr. et al. |
| 6,971,725 B2 * | 12/2005 | Holder ....................... 303/126 |

* cited by examiner

*Primary Examiner* — Bradley T King
*Assistant Examiner* — San Aung
(74) *Attorney, Agent, or Firm* — Barnes & Thornburg LLP

(57) ABSTRACT

A vent valve made from a standard emergency brake valve portion. It includes an emergency portion body with an interface to be mated with the emergency portion interface of the pipe bracket. The body includes a casting with at least one cover and the casting including all the cast cavities and passages for an emergency portion. A vent valve selectively connects a first brake pipe port to a vent port on the body, A vent piston controls the vent valve and a discharge valve pneumatically controls the vent piston. An emergency piston is responsive to brake pipe pressure for controlling the discharge valve. The body does not include at least one of an inshot valve and an accelerated application valve.

2 Claims, 4 Drawing Sheets

BRAKE CONTROL VALVE WITH AAV STABILITY

BACKGROUND AND SUMMARY

The present invention relates generally to emergency vent valves and more specifically to emergency vent valve and accelerated application sensor valve of a brake control valve.

A pneumatic brake control valve generally includes a service portion and an emergency portion mounted to a pipe bracket as shown in FIG. 1. The emergency portion 20 is shown as the emergency portion of a DB60, known as DB20 available from New York Air Brake Corporation and is described in U.S. Pat. No. 4,586,756.

The DB - 20 and DB -20L emergency portions currently use an accetrated application sensor valve which is either open or closed, but is otherwise independent to the emergency piston position and pilot pressure (i.e. Brake pipe reduction). This type of feature is an open-loop control system since it is either fully operating or closed. The drawback to this type of system is that in some reductions, the sensor valve may become self propagating. This occurs when relatively short lengths of brake pipe are attached to the emergency portion 20.

The function of the accelerated application is to propagate a brake pipe (BP) reduction signal throughout the train for improved braking application time. This is currently accomplished by the emergency piston moving upward in response to a drop in brake pipe pressure a pre-established distance to open the accelerated application sensor valve. This sensor valve allows quick action volume (QA) pressure to mix with brake pipe in a mixing chamber, and then is exhausted to the atmosphere by way of the accelerated application or pulsating valve. When sufficient brake pipe and quick action volume have been exhausted, the emergency piston stabilizes, closing the sensor valve, and hence arrest accelerated application activity.

However, as the brake pipe to quick action volume ratios decrease for the respective valve designs, the ability of the brake pipe pressure to stabilize the emergency piston becomes more difficult. As mentioned before, the sensor valve is both opened and feeding QA pressure to the mixing chamber, or it is closed stopping the accelerated application activity. As the sensor valve remains open, a constant volume of air is fed to the mixing chamber via a fixed orifice of the sensor valve.

This constant volume of air will continue the accelerated application activity until one of two events occur: 1) the QA pressure reduces to the point were when equalized in the mixing chamber, the pressure is unable to overcome the spring force of the pulsating valve; or 2) the sensor valve closes due to piston stability, stopping the flow of QA pressure to the mixing chamber. If this does not transpire, a further reduction in brake pipe pressure occurs, causing more piston instability, and continuing the cycle.

To eliminate the problem of a self propagating accelerated application, the introduction of a closed-loop control system is necessary. The present design of the emergency vent valve and the accelerated action sensor valve provides a closed-loop control of the accelerated application and stabilization of the emergency piston.

A brake control valve includes a volume and an emergency vent valve connected to an interface of a pipe bracket. The emergency vent valve includes a vent valve for selectively connecting a first brake pipe port to a vent port and a vent piston for controlling the vent valve. An emergency piston includes a first side connected to the volume port and a second side connected to a second brake pipe port A discharge valve is connect to the emergency piston and selectively interconnects the second side of the vent piston, the vent port and the volume port as a function of the displacement of the emergency piston. An accelerated application valve selectively connects the volume port and the second brake pipe port to the vent port in response to pressure from the volume port. An accelerated application sensor valve connected to the emergency piston and selectively connecting the volume port to the accelerated application valve as a function of the displacement of the emergency piston.

In a first embodiment, the discharge valve operates as and replaces the accelerated application sensor valve so as to also selectively connect the volume to the accelerated application valve. In which case, the discharge valve's connection of the vent port and the accelerated application valve to the second side of the vent piston and the volume port is a variable orifice whose opening varies as a function of the displacement of the emergency piston. In a second embodiment, the accelerated application sensor valve has a variable orifice. This may be the separate sensor valve or the combined valve of the first embodiment In a third embodiment, the discharge valve's connection of the vent port to the second side of the vent piston and the volume port is a variable orifice whose opening varies as a function of the displacement of the emergency piston. This discharge valve may be used alone or with the separate sensor valve of the second embodiment.

The variable orifice of the valves may include a valve seat and a tapered valve member connected to the emergency piston.

The discharge valve disconnects the volume port and the second side of the vent piston from the vent port for a brake release position of the emergency piston; connects the volume port and the second side of the vent piston to the vent port for a brake apply position of the emergency piston; and disconnects the volume port from the second side of the vent piston and the vent port and connects the second side of the vent piston to the vent port for an emergency position of the emergency piston.

In the first embodiment, the discharge valve disconnects the volume port from the accelerated application valve for the brake release position of the emergency piston, and connects the volume port to the accelerated application valve for the brake apply position of the emergency piston.

In the second embodiment, the accelerated application sensor valve disconnects the volume port from the accelerated application valve for the brake release position of the emergency piston, and connects the volume port to the accelerated application valve for the brake apply position of the emergency piston.

The discharge valve and the accelerated application sensor valve may be poppet valves in-line with the emergency piston. In the second and third embodiments, the discharge valve may be connected to the emergency piston by a lost motion mechanism such that the accelerated application sensor valve opens before the discharge valve opens.

Other objects, advantages and novel features of the present invention will become apparent from the following detailed description of the invention when considered in conjunction with the accompanying drawings.

DETAILED DESCRIPTION OF THE PREFERRED EMBODIMENTS

The intent of this design is to provide such a system for both the DB-20 and DB-20L emergency portions, for example. As mentioned previously, the accelerated application operation relies on the equalization of BP and QA pressure in the mixing chamber. The mixing chamber contains system BP pressure at all times during normal service operation. This pressure remains in the chamber via a diaphragm seal. As sufficient QA air pressure enters the chamber, the diaphragm opens, and equalized air is admitted to the accelerated application or pulsating valve, and then on to atmosphere.

The present design takes advantage of the piston position to control the flow of QA from the volume 34 to the mixing chamber MX. This is accomplished by creating a variable orifice for QA air flow to the mixing chamber MX (See FIGS. 1 and 2). As the emergency piston 244 moves toward the service stability position; QA air flow to the mixing chamber is reduced to a sufficient level to assist in arresting accelerated application activity (i.e. reduction in equalization pressure). This feature will prevent reductions in BP as the emergency piston 244 is stabilizing. The geometry of the needle valve 270 used for this control may be optimized to allow the necessary air flow in all service positions of the piston 244.

Because this design directly relates emergency piston position to QA air flow, accelerated application activity is more precisely controlled during service applications (i.e. Brake pipe reductions). As larger reductions are required, more QA air will be admitted to the mixing chamber MX, thus assisting in proper accelerated application activity, and signal propagation. Normal emergency functions will not be impacted due to the modification of the accelerated application sensor valve or the discharge valve.

Figure 2:
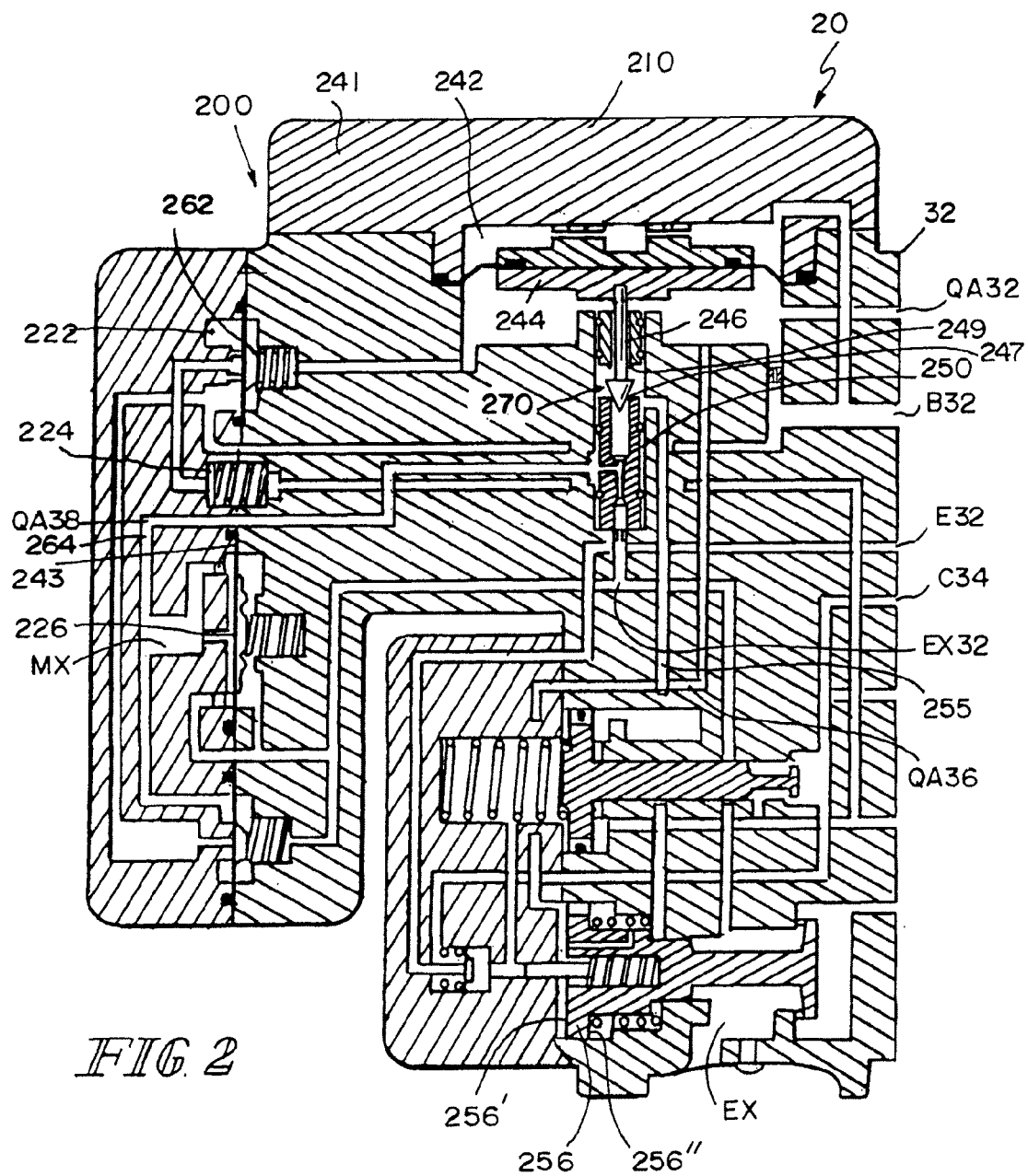
FIG. 2 is a schematic representation of a first embodiment of a modified portion of an discharge valve and accelerated application sensor valve according to the present disclosure.

The basic idea for the closed loop control mechanism for the accelerated application is illustrated in FIG. 2 for example. During the service lap position, the needle valve 270 is seated on the lower bushing seat 247, sealing pressure to both the atmosphere and the mixing chamber MX. A service lap position is created by equal BP (top side of piston 244) and QA (bottom side of piston 244) pressure. As BP reduces, a pressure differential between BP and QA forces the piston 244 upward, thus unseating the needle valve 270 off seat 247. This allows QA air into the lower bushing and out to: 1) atmosphere; and 2) the mixing chamber MX. The piston travel and hence the QA air flow are a function of the initial BP reduction. The more aggressive the reduction (i.e. higher BP drop) the greater the upward movement of the piston 244, and the greater the air flow to the mixing chamber MX. This allows for precise control of accelerated application activity, and incorporates feedback control mechanism into the accelerated application function.

The emergency application feature of the emergency portion 20 are accomplished by the upward movement of the emergency piston 244 such that the needle valve 270 seals on the upper bushing seat 249. This will allow for the normal sequence of events to occur which are necessary to produce an emergency application. This includes opening the vent valve 256 to connect the brake pipe port B34 to atmosphere.

Figure 1:
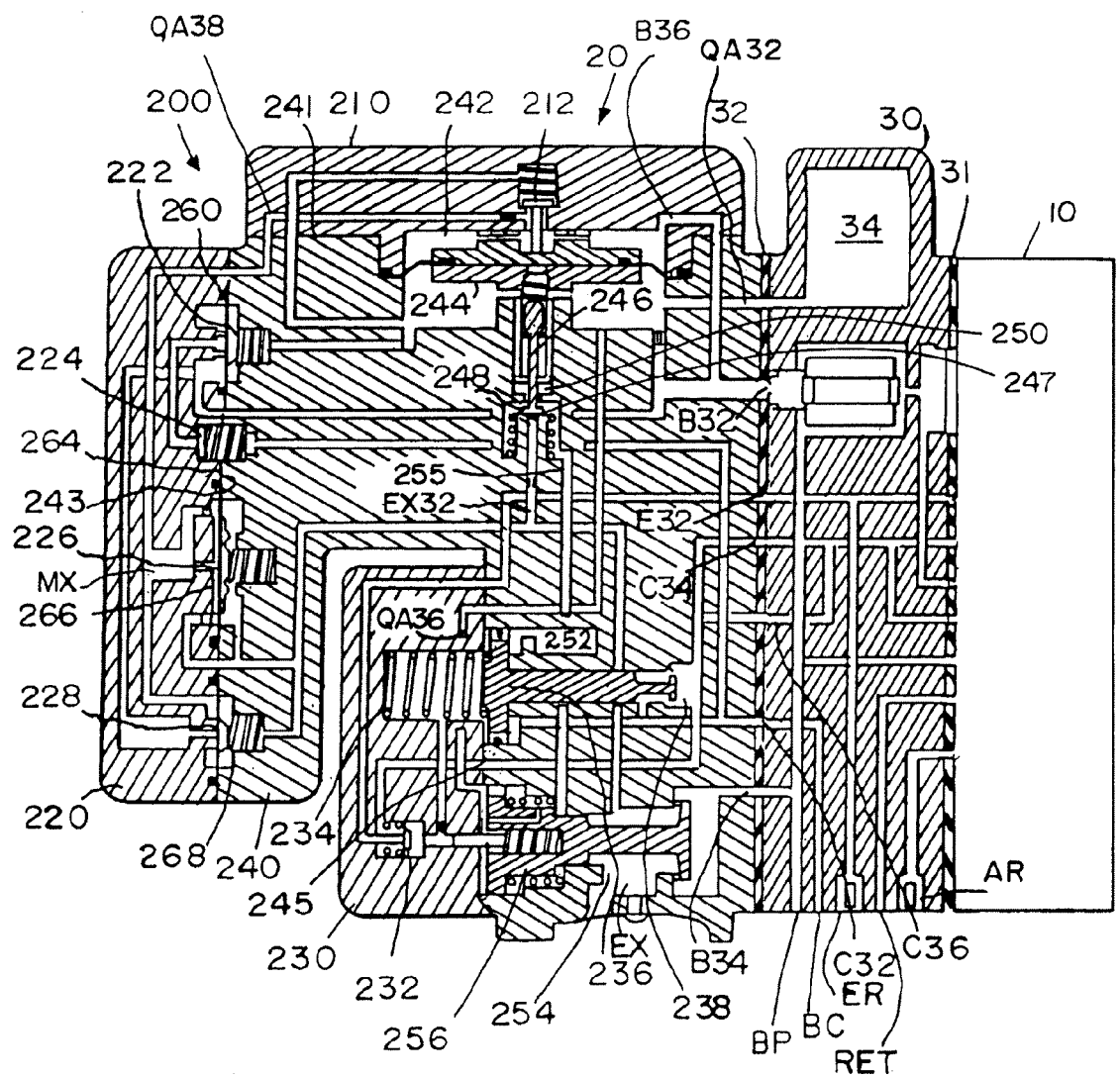
FIG. 1 is a schematic of a brake control valve having a service portion and emergency portion mounted to a pipe bracket according to the prior art.
Figure 3:
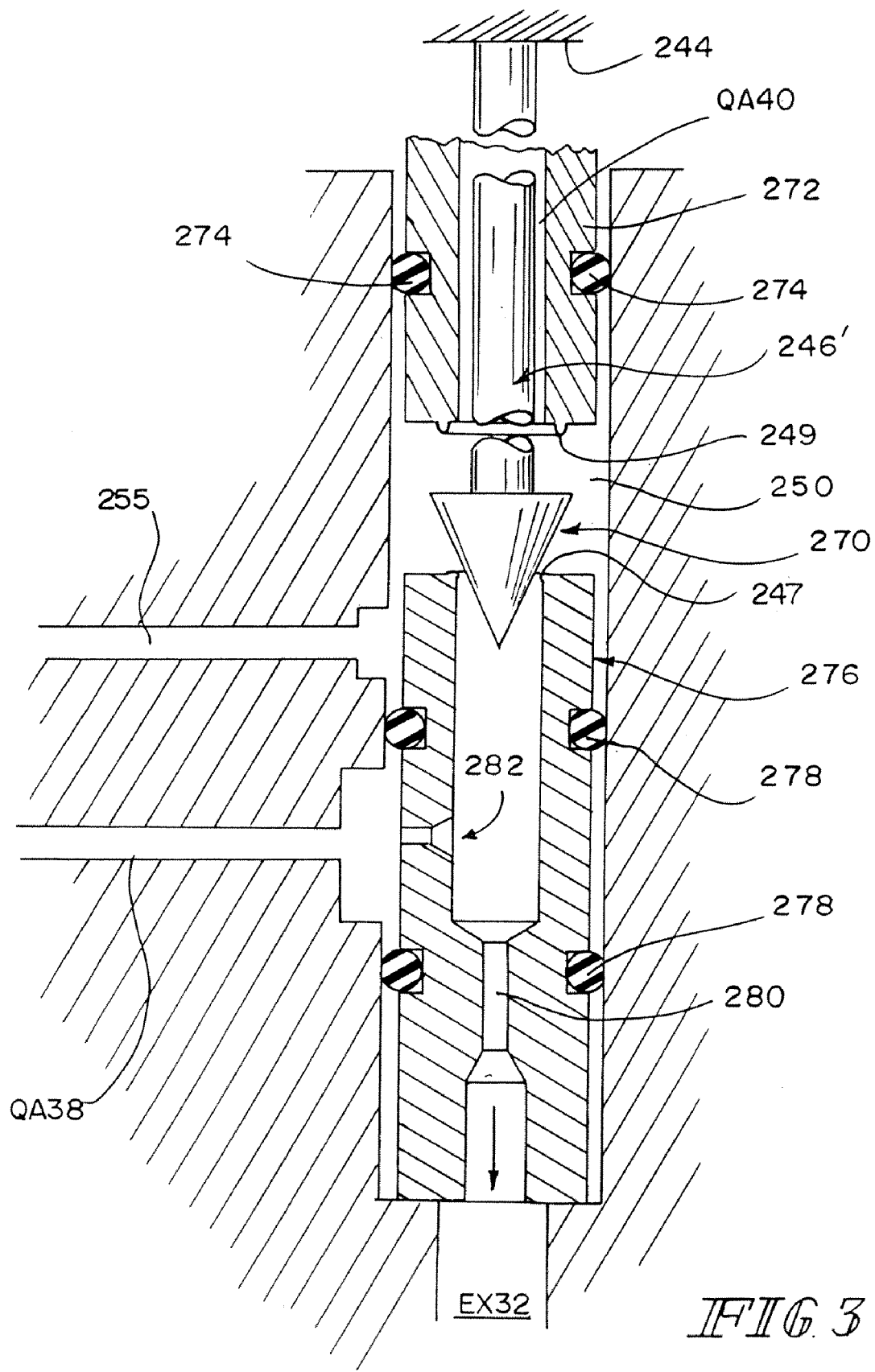
FIG. 3 is an enlarged detail of the modified discharge valve and the accelerated application sensor valve of the first embodiment.
Figure 4:
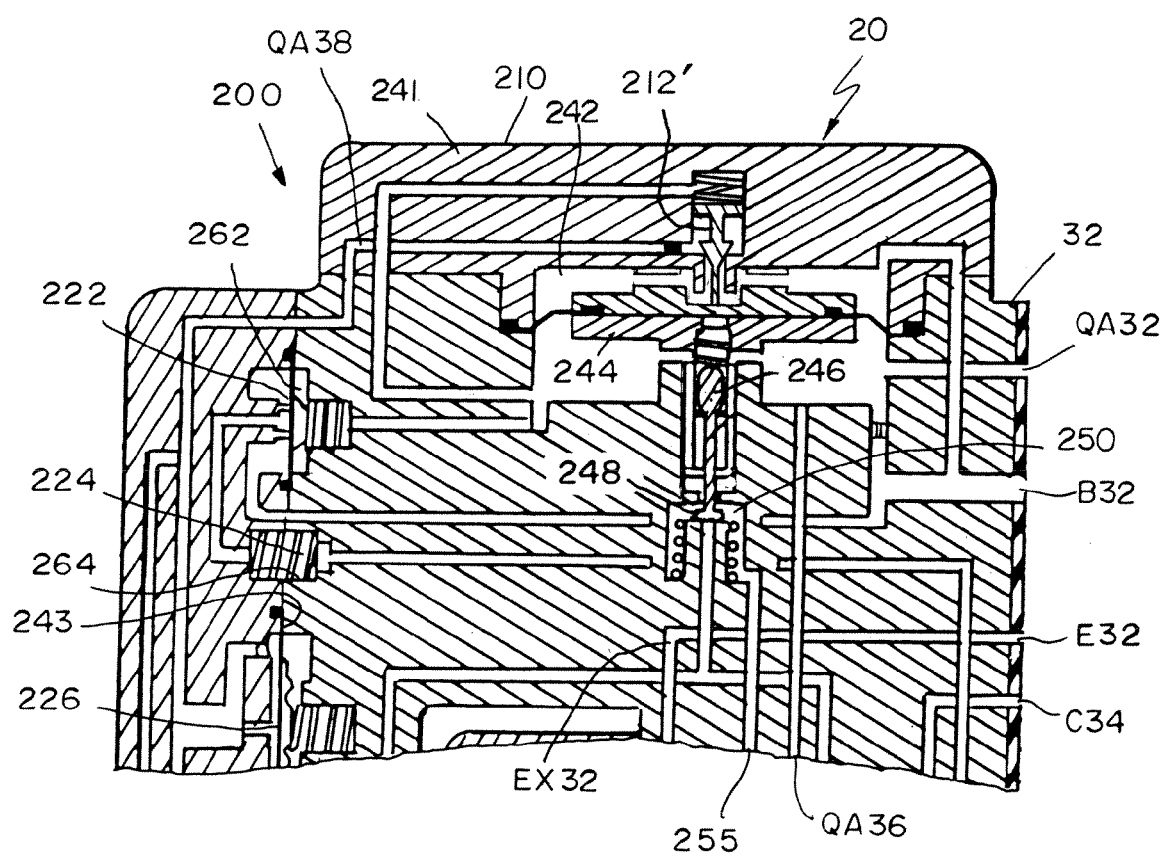
FIG. 4 is a schematic representation of a second embodiment of a modified portion of an accelerated application sensor valve according to the present disclosure.

An example of the prior art brake control valve is illustrated in FIG. 1 and the modifications are illustrated in FIGS. 2-4. A description of the operation of the prior art will proceed the description of the modifications.

FIG. 1 shows a brake control valve according to the prior art. The brake control valve includes a standard service portion 10 is mounted to a pipe bracket 30 at interface 31 and a standard emergency portion 20 is connected to the adaptor plate 40 at interface 32. The brake control valve will operate in a pneumatic mode using service portion 10 and an emergency portion 20. If an electrical controlled pneumatic (ECP) portion is used in an overlay with the standard brake control valve, the car control device of the ECP will control the braking of the brake cylinder. See U.S. Pat. No. 5,967,620 to Truglio et al. as an example.

To aid in understanding the various passages within the control valve, the brake pipe passage is represented by a "B", the brake cylinder passages by a "C", the emergency reservoir passages by an "E", the retainer passage by an "R", the auxiliary reservoir passage by a "A", the quick action or control volume by "QA", exhaust or atmosphere by "EX" and the control valve or brake signal passage from the emergency portion for the brake cylinder by a "V".

The emergency portion 20 is shown as the emergency portion of a DB60, known as DB20 available from New York Air Brake Corporation and is described in U.S. Pat. No. 4,586,756.

The emergency portion 20 includes a body 200 having covers 210, 220 and 230 mounted on faces 241, 243 and 245 of a casting 240. The cover 210 includes passages and a cavity for an accelerated application in the sensor valve 212.

The cover 220 includes cavities and passages for an emergency acceleration release valve 222, an emergency acceleration release check valve 224, mixing chamber MX, a pulsating valve 226 and a brake pipe (BP) discharge valve 228. The pulsating valve 226 and the BP discharge valve 228 form an accelerated application valve.

The cover 230 includes passages and cavities for a high pressure valve 232 and the spring portion 234 of an inshot valve 236. Valve portion 238 of the inshot valve 236 defines the two stage build up of the brake cylinder.

The casting 240 includes a cavity 242 in face 241 for an emergency piston 244. The emergency piston 244 is connected by lost motion arrangement 246 to discharge valve 248 in cavity 250. The inshot valve 236 is in cavity 252 in face 245 of the casting 240. Cavity 254 also in face 245 is provided for a vent valve 256. The cover 230 covers the cavities 252 for the inshot valve 236 and cavity 254 for the vent valve 256. The casting 240 includes cavities 262, 264, 266 and 268 in face 243 for the emergency acceleration release valve 262, the emergency acceleration release check valve 264, pulsating valve 266 and the BP discharge valve 228 of the accelerated application valve. These cavities are covered by cover 220 and are bored into the face 243 of casting to connect with the internal passages which are part of the casting 240. The other cavity described are part of the casting and are not bored.

As is well known, the emergency piston 244 has brake pipe pressure on its top surface via passage B36 to the brake pipe interface port B32. The bottom of the emergency piston is connected by passage QA34 to control volume interface port QA32 for a control volume 34 in the pipe bracket 30, known in the industry as a "quick action chamber". The change of the brake pipe BP pressure changes the position of the emergency piston 244. The emergency piston 244 operates the accelerated application sensor 212. It also operates the discharge valve 248 through the lost motion apparatus 246.

The vent valve 256 selectively connects the brake pipe and brake pipe interface port B34 to exhaust via passage EX32. The left side 256' of the piston portion of the vent valve 256 is connected via passage QA36 to the control volume port QA32. The right side 256" of the piston portion of the vent valve is selectively connected via passage 255 by the QA discharge valve 248 to the either the vent port or the control volume port CV32. In response to an emergency pressure drop in the brake pipe, the emergency piston 244 operates QA discharge valve 248 to move the vent valve 256 to open and connect the brake pipe port B34 to exhaust.

The inshot valve 236 is shown in the position for a service application thereby allowing the brake cylinder port C32 to have unrestricted flow. In an emergency application, the high pressure valve 232 changes position from that shown, which allows the inshot valve 236 to move to the left causing the end 238 to be restricted and thereby slow down the build up of the brake cylinder pressure at port C32 during its first stage. After given a period of time, the inshot valve 236 is moved back to the right for unrestricted flow. This two stage build up is standard to prevent different cars of the train coming on to full emergency brake before others start braking. This restriction of flow prevents the use of the emergency portion 20 from being used to drive more than one car set form the brake cylinder port BC.

The pulsating valve 226 and the BP discharge valve 228 of the accelerated application valve are responsive to the pressure provided to the mixing chamber MX by the opening of the acceleration application sensor valve 212 via passage QA38 to connect the brake pipe port B32 to exhaust at chamber 254. This accelerates the signal of the brake pipe as well as the operation of the emergency piston 244.

FIGS. 2 and 3 show the first embodiment wherein the quick action sensor valve 212 has been incorporated into the quick action discharge valve 248 as in a single valve 270. Since they are combined, the connection 246' of the combined quick action QA discharge and sensor valve 270 to the piston 244 is a direct connection instead of a lost motion as in FIG. 1. The combined QA valve 270 still rests against the lower valve seat 247 for release condition, is released from valve seat 247 but does not reach valve seat 249 for a service application and comes to rest on the valve seat 249 in emergency conditions. The QA valve 70 is tapered and forms a variable orifice with valve seat 247, which opening varies as a function of the displacement of the emergency piston 244.

With the elimination of the QA sensor valve 212 at the top of the housing, the passage QA 38 from the QA sensor valve to the mixing chamber MX is removed from the cover 210 and is connected internal the body 200 to the mixing chamber MX.

Cavity 250 includes a first bushing 272 secured in the cavity 250 by o-rings 274. The connection 246' of the QA valve 270 to the piston 244 is spaced from the interior bushing 272, so as to create a passage QA 40 between the QA air under the diaphragm 244 and the cavity 250. Valve seat 249 is on the face of the bushing 272. A lower bushing 276, which includes the valve seat 247, is also secured in the cavity 250 by o-rings 278. A restriction or choke 280 connects the bore of the bushing 276 to exhaust passage EX 32. The cavity 250 between the two valve seats 247 and 249 is connected to the vent valve 256 by passage 255. A choke 282 connects the interior bushing 276 to the mixing chamber MX by the passage QA 38. This is the passage which is removed from the cover 210.

As discussed previously, the tapered valve 270 forms a variable orifice and the closed loop control mechanism for the accelerated application. During the service lap position, the needle valve 270 is seated on the lower bushing seat 247, sealing pressure to both the atmosphere and the mixing chamber MX. A service lap position is created by equal BP (top side of piston 244) and QA (bottom side of piston 244) pressure. As BP reduces, a pressure differential between BP and QA forces the piston 244 upward, thus unseating the needle valve 270 off seat 247. This allows QA air into the lower bushing and out to: 1) atmosphere via EX32; and 2) the mixing chamber MX via QA38. The piston 244 travel and hence the QA air flow are a function of the initial BP reduction. The more aggressive the reduction (i.e. higher BP drop) the greater the upward movement of the piston 244, and the greater the air flow to the mixing chamber MX. This allows for precise control of accelerated application activity, and incorporates feedback control mechanism into the accelerated application function.

Another feedback mechanism for the accelerator application operation is illustrated in FIG. 4. FIG. 4 differs from the prior art of FIG. 1 by basically creating a variable orifice at the quick action sensor valve 212'. The new valve 212' has a tapered body similar to the tapered body 270 of FIG. 3. Thus it functions the same way to provide a variable orifice which is a function of the position of the emergency piston 244. The QA discharge valve 240 is not modified from that of FIG. 1. As a variation of FIG. 4, the QA discharge valve 248 may be replaced by the tapered valve 270. In which case, the connection 246 of the valve 270 may be a direct connection to the emergency piston 244 since lost motion would not be necessary. The tapered valve 270 would provide a variable orifice, which is a function of the displacement of the emergency piston 244.

As even a further option, only the QA discharge valve 248 may be the tapered valve 270. It could be connected to piston 244 by a direct connection 246', instead of a lost motion connection. The regular QA sensor valve 212 would be used. This would provide feedback of stabilization of the emergency piston 244 since the variable orifice would be a function of the position of the piston 244. This may require some modification to the brake valve.

Although the present brake valve has been described and illustrated in detail, it is to be clearly understood that the same is by way of illustration and example only, and is not to be taken by way of limitation. The vent valve of the present invention may be also used at the emergency portion interface of a single sided pipe bracket. The scope of the present invention are to be limited only by the terms of the appended claims.

What is claimed:

1. A brake control valve including a volume, an emergency vent valve connected to an interface of a pipe bracket, the interface including first and second brake pipe ports and a volume port, the emergency vent valve comprising:

a vent valve selectively connecting the first brake pipe port to a vent port;

a vent piston controlling the vent valve, the vent piston including a first side connected to the volume port and a second side;

an emergency piston including a first side connected to the volume port and a second side connected to the second brake pipe port;

an accelerated application valve selectively connecting the volume port and the second brake pipe port to the vent port in response to pressure from the volume port;

a discharge valve connected to the emergency piston and selectively interconnecting the second side of the vent piston, the vent port, the volume port and the accelerated application valve as a function of the displacement of the emergency piston;

the discharge valve's connection of the vent port to the second side of the vent piston and the volume port is a variable orifice whose opening varies as a function of the displacement of the emergency piston; and the discharge valve disconnects the volume port from the accelerated application valve for the brake release position of the emergency piston, and connects the volume port to the accelerated application valve for the brake apply position of the emergency piston.

2. A brake control valve including a volume, an emergency vent valve connected to an interface of a pipe bracket, the interface including first and second brake pipe ports and a volume port, the emergency vent valve comprising:

a vent valve selectively connecting the first brake pipe port to a vent port;

a vent piston controlling the vent valve, the vent piston including a first side connected to the volume port and a second side;

an emergency piston including a first side connected to the volume port and a second side connected to the second brake pipe port;

an accelerated application valve selectively connecting the volume port and the second brake pipe port to the vent port in response to pressure from the volume port;

a discharge valve connected to the emergency piston and selectively interconnecting the second side of the vent piston, the vent port, the volume port and the accelerated application valve as a function of the displacement of the emergency piston; and the discharge valve disconnects the volume port from the accelerated application valve for the brake release position of the emergency piston, and connects the volume port to the accelerated application valve for the brake apply position of the emergency piston.

\* \* \* \* \*